United States Patent

Marron et al.

[11] Patent Number: 5,175,651
[45] Date of Patent: Dec. 29, 1992

[54] MULTI-FOCUS SYSTEM FOR A LOW LIGHT LEVEL VISION APPARATUS

[75] Inventors: Joseph C. Marron, Brighton; Anthony M. Tai, Northville, both of Mich.

[73] Assignee: Environmental Research Institute of Michigan, Ann Arbor, Mich.

[21] Appl. No.: 663,270

[22] Filed: Mar. 1, 1991

Related U.S. Application Data

[63] Continuation-in-part of Ser. No. 324,827, Mar. 17, 1989, Pat. No. 5,073,021.

[51] Int. Cl.⁵ .................... G02B 3/10; G02B 27/28; G02B 27/44; H01J 31/50
[52] U.S. Cl. .................... 359/721; 250/214 VT; 359/494; 359/498; 359/566; 359/570
[58] Field of Search .............. 359/721, 722, 723, 494, 359/498, 566, 570; 250/213 VT

[56] References Cited

U.S. PATENT DOCUMENTS

| | | | |
|---|---|---|---|
| 3,520,592 | 7/1970 | Leib et al. | 350/150 |
| 3,536,921 | 10/1970 | Caulfield | 250/199 |
| 3,944,346 | 3/1976 | Shindler | 351/49 |
| 4,302,081 | 11/1981 | Tsuetaki | 351/161 |
| 4,376,889 | 3/1983 | Swift | 250/213 VT |
| 4,550,984 | 11/1985 | Reymond | 350/404 |
| 4,574,197 | 3/1986 | Kliever | 250/334 |
| 4,637,697 | 1/1987 | Freeman | 351/161 |
| 4,641,934 | 2/1987 | Freeman | 351/159 |
| 4,642,112 | 2/1987 | Freeman | 623/6 |
| 4,655,565 | 4/1987 | Freeman | 351/159 |
| 4,783,152 | 11/1988 | Nishimoto | 350/379 |

OTHER PUBLICATIONS

"Diffractive Bifocal Contact Lenses", W. N. Charman, BSC, PHd Contax May 1986.
"The Holographic Bifocal Contact Lens", Suzanne St. Cyr, Holosphere, vol. 15, No. 5, Fall, 1988.

*Primary Examiner*—Scott J. Sugarman
*Attorney, Agent, or Firm*—Krass & Young

[57] ABSTRACT

A night vision apparatus 10 includes a first focusing refracting lens 28 which focuses light rays 29 from distant scene 14 onto a light intensifier 30. The kinoform 40 or bifringent lens 78 are disposed in the light path to allow light rays 35 from near scene 18, 20, 22 and 24 to be focused onto light intensifier 30 to form a multi-focus night vision apparatus with increased depth of focus.

29 Claims, 2 Drawing Sheets

MULTI-FOCUS SYSTEM FOR A LOW LIGHT LEVEL VISION APPARATUS

RELATED APPLICATION

This patent application is a continuation-in-part of copending patent application U.S. Ser. No. 324,827 filed Mar. 17, 1989, now U.S. Pat. No. 5,073,021. The disclosure of copending patent application U.S. Ser. No. 324,827 is incorporated herein by reference.

TECHNICAL FIELD

This invention relates to an optical apparatus and more particularly to a low light level vision apparatus having multi-focal capability.

BACKGROUND OF THE INVENTION

Low light vision systems, commonly referred to as night vision systems, are extremely valuable for detecting and observing distant objects at nighttime. Night vision systems are commonly incorporated in goggles which are worn by a user who looks through the goggles. A standard night vision system has a mono-focus optical lens system. Consequently, only objects that fall within the depth of focus are sharply focused. The optics of a night vision system typically have a low f number which renders a small depth of focus. Thus, the requirement for refocusing objects at different ranges is especially critical.

The need for refocusing of a monofocus night vision system is particularly noticeable when the scenery is at a far distance so that one focus is at near infinity and the other objects of interest for example a map, a dashboard, a gun sight or other piece of equipment are within a few feet of the operator. Because of the low f number of the optics, the objects at the close distance are extremely out of focus and may not even be identifiable from other out-of-focus background light.

Previous adjustment devices for changing the focus required for standard night vision systems have not been satisfactory. If the operator's situation requires his hands to be constantly in use for other pieces of equipment, a manual focusing system can be disadvantageous. Automatic focusing, on the other hand, necessitates extra hardware and extra weight associated therewith that can be cumbersome to the operator who wears the goggles. Manual and autofocusing systems are also disadvantageous for situations which require constant monitoring or attention of the distant outside scenery. Furthermore, adjustable monofocus systems whether automatic or manual are incapable of simultaneous viewing of objects at widely separated distances such as a conventional gun sight and distant target. For adequate utility, night vision system must be able to have simultaneous focusing of both the relatively close gun sight and the distant target.

One attempt at providing a dual focus night vision apparatus is disclosed in U.S. Pat. No. 4,376,889 issued to David W. Swift on Mar. 15, 1983. This system discloses a bi-focal optical system which has either an aperture or a small lens centrally located within a larger wave filter or diverging lens. The diverging lens has a wave filter incorporated therein. In another disclosed embodiment, a pair of holograms are used to focus closer objects into the night vision system. One of the holograms fills an aperture cut into a filter. The filter allows light from the distant objects to be focused into the night vision system.

There are several distinct disadvantages with the bi-focal system of U.S. Pat. No. 4,376,889. Firstly, a light vision system is extremely sensitive and its pupil needs to be adjusted to compensate for night vision during full moonlight, a new moon, or differing artificial lighting conditions. The split-lens system shown in U.S. Pat. No. 4,376,889 is incompatible with a single iris that is made to attenuate the total amount of light coming into the night vision system. More generally, diffraction problems arise with split lenses used in conjunction with a small pupil. Secondly, with the holographic lenses, the use wavelength filters are needed to provide for adequate focusing free of chromatic aberrations. The wavelength filters are used also to prevent flooding of undesired light onto the light intensifier. The wavelength filters are inefficient and require that the cockpit of an aircraft or dashboard of a motor vehicle used by the operator be lit in a particular bandwidth of light to perform correctly. The wavelength filters prevent use of these dual focus systems in vehicles that are illuminated by light outside the selected bandwidth. Thirdly, if the night vision system for selected bandwidth is inadvertently used in a vehicle having incompatible interior illumination, the operator can be placed in a dangerous situation. Furthermore, the filtering of bandwidth of light from the exterior scene further reduces available light that can be used by the light intensifier to form the intensified image under certain artificially illuminated conditions. Lastly, the formation of an aperture in a lens or filter and the placement of a second lens or hologram within the aperture requires a relatively expensive assembly process.

What is needed is an economical multi-focal night vision system that is retrofittable to standard monofocus systems. Furthermore, what is needed is a multi-focus night vision system that is compatible with an adjustable iris to attenuate the total amount of light impinging the light intensifier. What is also needed is a multi-focus night vision system that can easily proportion the amount of light focused from the near scene relative to the amount of light focused from the distant scene. A dual focus night vision system is also needed that can be generally used in any vehicle regardless of the bandwidth of the interior illumination.

SUMMARY OF THE INVENTION

According to one aspect of the invention, a low-light optical apparatus includes a light intensifier for intensifying a received image. First and second focusing systems are disposed in the light path to the light intensifier for focusing light from respective first and second distances onto the light intensifier. The second focusing system overlaps the first focusing system which defines an object aperture. In one embodiment, the first focusing system includes a refracting lens positioned in and filling the objective aperture. The second focusing system includes a diffraction lens such that with some light from the second distance diffracted by the diffraction lens and is then focused by the refracting lens onto the light intensifier. The proportion of diffracted light, which contains added optical power, and undiffracted light can be adjusted by controlling the groove depth in the fabrication of the diffraction lens. In one embodiment, the diffraction lens is a separate member and mountable adjacent the refracting lens. In another embodiment, the diffraction lens is integrally formed with the refracting lens. Preferably, the diffraction lens and refracting lens define and coextend over the same objective aperture.

Further according to one embodiment, the night vision system includes a single adjustable iris on axis with the first and second focusing systems and in proximity to the objective aperture for adjustably attenuating the total amount of light impinging on the light intensifier from the first and second distances.

In an alternate embodiment, the first and second focusing systems include a refracting birefringent lens constructed for focusing light of a first polarity from a first distance onto the light intensifier and focusing light having a second polarity substantially orthogonal to the first polarity from a second distance onto the light intensifier.

It is preferable to include a separate polarizing filter that is rotatably adjustable with respect to the birefringent lens to vary the ratio of light of the first polarity and the second polarity that is transmitted to the light intensifier.

According to another aspect of the invention, a retrofit second focusing system is placed in the light path of a monofocus system and overlaps the objective aperture formed by the monofocus system which is set to focus light from a first distance. The retrofit focusing system allows some light from said first distance to pass therethrough unaffected such that the monofocus system retains the capability of focusing an image from the first distance. The retrofit system also changes the path of light from a second distance to provide simultaneous focusing of light from the second distance.

In one embodiment, the retrofit second focusing system includes a birefringent lens having zero power at a first polarity and providing for refraction of light at a second polarity substantially orthogonal to said first polarity to allow the standard monofocus system of the night vision system to focus light from a second distance onto the light intensifier.

In another embodiment, the retrofit second focusing system includes a diffraction lens constructed to diffract a portion of light passing therethrough where the diffracted portion of light from a second distance is focused by the monofocus system onto the light intensifier. A portion of light from the first distance is allowed to pass through the diffraction lens undiffracted. i.e., undergoing zero order diffraction, such that the monofocus system retains the capability of focusing undiffracted light from s id first distance onto the light intensifier.

It should be understood that the order or position of the diffraction lens and refracting lens may be reversed, i.e. light may be refracted first and then pass through the diffraction lens to provide the dual focus of the optics system.

More broadly, the invention relates to a night vision system having a first focus system which focuses an image from a first distance substantially through an entire objective aperture and a second focusing system for focusing an image from a second distance within said same objective aperture. The second focusing system may be used in conjunction with the first focusing means for focusing an image from the second distance, i.e., the light may sequentially be affected by both focus system in order to focus onto said light intensifier.

BRIEF DESCRIPTION OF THE DRAWINGS

Reference now is made to the accompanying drawings in which.

DETAILED DESCRIPTION OF THE PREFERRED EMBODIMENT

Figure 1:
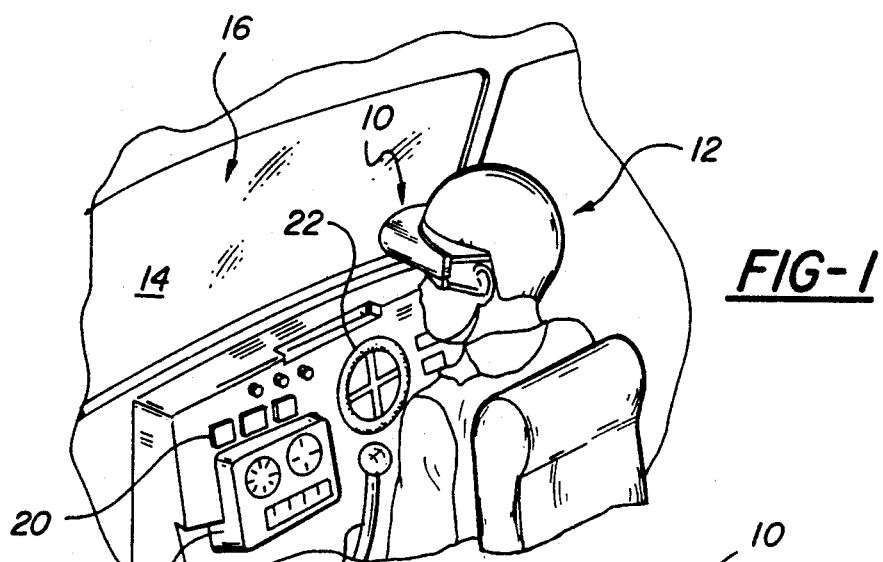
FIG. 1 is a representation of an operator wearing a night vision apparatus for viewing both a distant scene through a transparent windshield and a close scene such as a dashboard and equipment within arm's reach.

Reference now is made to FIG. 1 which schematically shows a night vision goggle 10 for use in low-level light conditions such as nighttime so that an operator 12 can view or monitor a distant scene 14 through windshield 16 and also view close objects such as the dashboard 18, equipment 20, steering wheel 22 and drive apparatus 24 which can collectively be referred to as the near scene 25.

Figure 2:
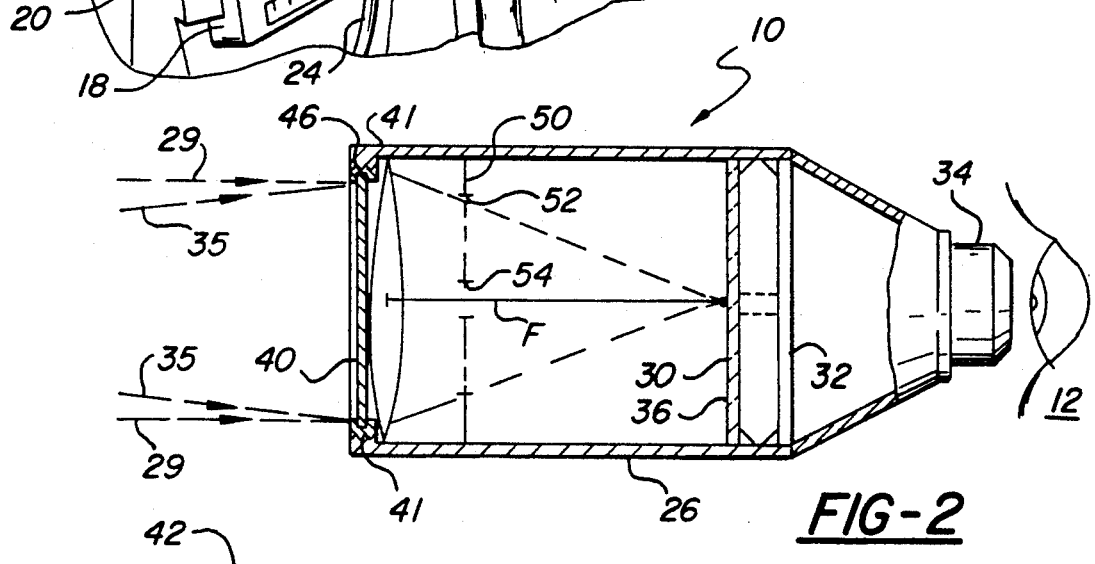
FIG. 2 is a side elevational, partially segmented schematic view of the night vision system according to one embodiment of the invention.

The night vision goggles 10 shown in more detail in FIG. 2 include a housing 26 that mounts an objective refracting lens 28 with a focal length f. Light rays 29 from distant scene 14 are focused onto a screen 36 of light intensifying mechanism 30. The objective refracting lens 28 has a conventional construction and defines objective aperture 38. The lens 28 is illustrated as a single lens; however, it should be understood that multi-piece lens assemblies can be easily substituted for single lens 28. The term "lens" shall mean either an individual refracting element or an assembled multi-component that focuses light. The lens 28 is normally unable to focus light rays 35 emanating from near objects 18, 20, 22 and 24. The light intensifying mechanism 30 forms an intensified image that impinges on screen 36 at its output screen 32 which is viewed through optical eyepiece 34. The objective lens 28 defines an objective aperture 38. A diffraction lens 40 also referred to as a zone lens, a kinoform lens or holographic lens is mounted to housing 26 in the path of light rays 29 from the scene 14 to lens 28. The lens 40 coextends and effectively covers the defined objective aperture 38.

Figure 3:
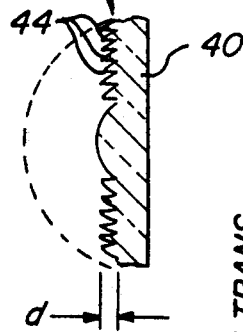
FIG. 3 is an enlarged schematic fragmentary segmented view of the kinoform lens shown in FIG. 2.

Reference to FIG. 3 shows the details of the kinoform lens including one surface 42 having a plurality of Fresnel annular zones 44 with a depth d. If the depth d is greater than one wavelength of light, virtually all of the transmitted light on the lens 40 is diffracted. If on the other hand, the depth d approaches zero, i.e. the surface 42 is flat, virtually all of the transmitted light is undiffracted, i.e. or goes through zero order diffraction. If the depth d is a fraction of the wavelength of incident light, some portion of transmitted light is undiffracted, and another portion of transmitted light is diffracted through the first order.

Figure 4:
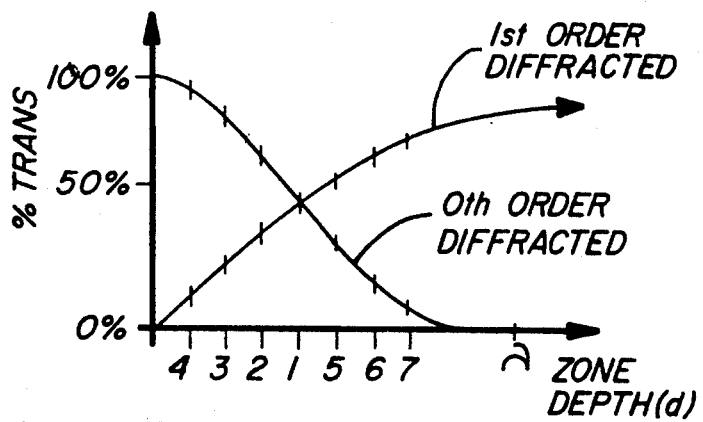
FIG. 4 is a graph schematically showing the percentage of diffracted and undiffracted light transmitted through kinoform lenses with zone depths varying from zero (plate glass) to one wavelength of light.

The graph shown in FIG. 4 schematically illustrates the proportions of transmitted light undergoing zero order diffraction for the different depths d up to a full wavelength of light. At approximately $d = \frac{1}{2}\lambda$ of light, approximately 41 percent undergoes zero order diffraction and 41 percent undergoes first order diffraction for over 80 percent efficiency.

The Fresnel zones 44 can be shaped to have a focal length corresponding to the average distance of the near objects 18, 20, 22 and 24 for the first order diffracted light. Such a focal length of a few feet diffracts the light rays 35 from near scene 25 to change its path so it can be subsequently refracted by lens 28 to focus an image of the near objects on the light intensifier 30. Simultaneously, a significant portion of light from distant scene 14 can pass through the kinoform with zero order diffraction and be focused by refracting lens 28 onto light intensifier 30.

The kinoform lens 40 can be retrofitted on presently existing monofocus night vision systems such as shown in FIG. 2 by fitting it in a frame 46 that can be screwed into the front end 41 of housing 26. Other methods of attachment can also be used such as a bayonet fit or a press fit with an appropriate cap mounting mechanism.

A kinoform having a depth d of one-half wavelength provides for equal amounts of zero order and first order diffracted light to render focused images of the near scene and distance scene with respective intensities that correspond to the incoming intensities of the two different scenes. However, it also can be foreseen that the near scene may be more brightly illuminated as by an illuminated dashboard so that intensifies that correspond to the real scenes are not desired. It may be desirable that only 20 percent of the light be diffracted. As such, a diffraction lens 40 having a kinoform depth d equal to approximately 1/5 wavelength is desired. As illustrated in FIG. 4 the illuminated dashboard position 3 in FIG. 4 in which an illuminated dashboard would only have a small amount less than 20 percent of its light focused and a much greater proportion of light from the distant scene is focused to provide for focused images of near equal intensities. As can be seen, a series of kinoforms having different depths can accompany the goggles such that on any given outing, depending on whether the outside is brightly lit or depending on the interior brightness, the particular kinoform can be properly selected for use. Any number of kinoforms can be made with varying depths d such as for every five percent or every 10 percent difference between zero and first order diffractions. FIG. 4 illustrated an exemplary series of kinoform lenses with different groove depths varying by $1/10\lambda$ to $\lambda$ to properly adjust the relative intensities of the near scene image with the distant scene image.

Furthermore, the night vision apparatus 10 can have an adjustable iris 50 having a wide open position 52 which corresponds to the objective aperture 38 of objective lens 28. The iris 50 can be closed to a smaller position 54 to attenuate the light from both the distant scene 14 and the near objects 18-24 that impinges upon light intensifier 30. The iris 50 is adjustable in a conventional fashion.

It should also be noted that a portion of light from distant scene 14 that is diffracted by the kinoform forms an extremely out of focus, i.e. defocused, image. Conversely, a portion of light from near objects that is not diffracted through kinoform lens forms a second defocused image.

The two defocused images simply add a bias to the image which results in only a slight degradation in the preceived image quality. It should also be noted that no spectral filtering is present. Without spectral filtering, the operation of the night vision system 10 is not limited to specific lighting conditions either for the distant scene or the near scene.

Figure 5:
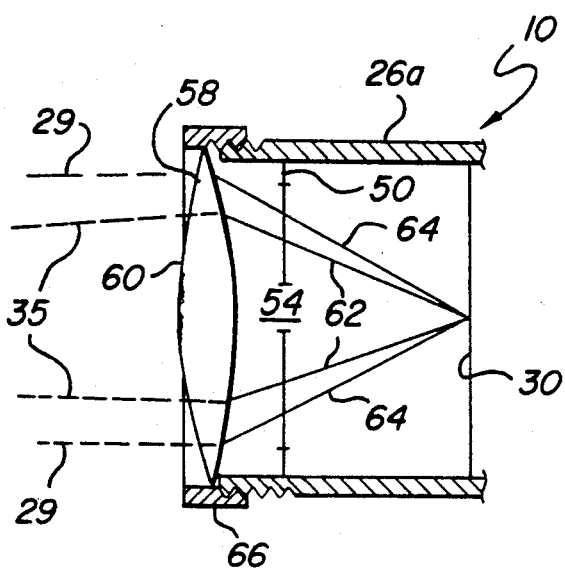
FIG. 5 is a fragmentary schematic view of a second embodiment of the invention.

For new night vision apparatus that are made according to the invention, reference now is made to FIG. 5. FIG. 5 discloses a night vision apparatus 10 that has a lens 58 replacing lens 28 and kinoform 40. The lens 58 has a kinoform 60 integrally formed on one of its surfaces. The kinoform 60 functions in the same fashion as separate kinoform 40 shown in FIG. 2. A double convex lens 58 is illustrated; however, a plano-convex lens can be used for expeditious manufacturing of the kinoform 60 on the planar surface of lens 58. The kinoform 60 focuses light rays 35 emanating from a near object in conjunction with refracting lens 58 onto light intensifier 30. A portion of light rays 29 from distant scene undergo zero order diffraction through the kinoform such that they are refracted by the lens 58 to focus onto light intensifier 30. The night vision apparatus 10 in FIG. 5 also has an adjustable iris 50 which attenuates the total amount of light impinging upon light intensifier 30.

The lens 58 can be attached to a frame 66 which can be mounted onto housing 26a so that if a different kinoform such as the ones illustrated in FIG. 4 is desired, the lens 58 and housing 66 can be merely dismounted from the housing 26 and a different lens and housing unit can then be attached in its place. A series of lenses 58 can accompany the night vision apparatus 10 to accommodate different lighting conditions.

Figure 6:
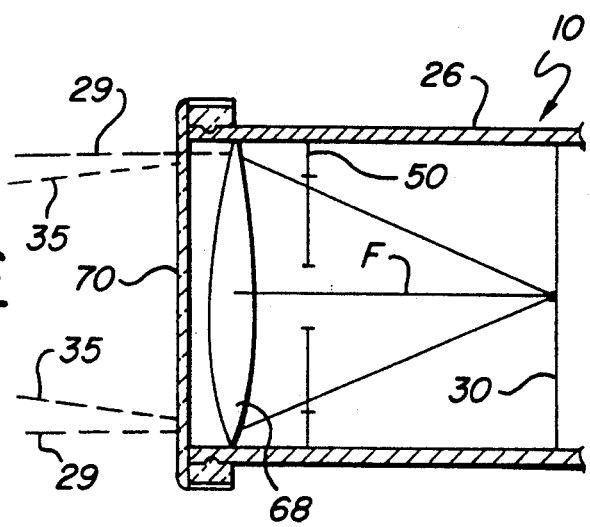
FIG. 6 is a fragmentary schematic view of a third embodiment of the invention.

Referring now to FIG. 6, modified dual focus night vision apparatus 10 uses birefringent lens 68 mounted in place of either lenses 28,58 or kinoforms 40,60. Typically birefringent lens 68 is a doublet lens with two lenses 68a,68b bonded together. Birefringent lens 68 has one focal length for light of one polarity with respect to the lens and another focal length for light of a second polarity orthogonal to the light of the first polarity. The birefringent lens 68 can be designed such that its refractive power along one axis of polarity focuses the light rays 35 emanating from the near scene of one polarity onto the light intensifier. The birefringent lens 68 can have focal length f along the fast axis for focusing light rays 29 of the corresponding polarity emanating from the distant scene onto light intensifier 30. As such, the birefringent lens 68 produces a focused image of near objects 18, 20, 22 and 24 and a focused image of far scene 14 using orthogonally polarized light from each distance.

Figure 7:
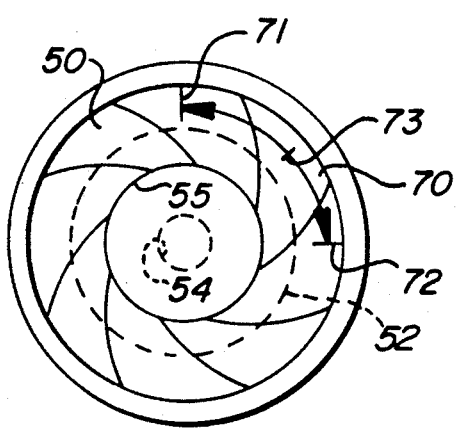
FIG. 7 is a front elevational view taken along the line 7—7 in FIG. 6.

Iris 50 is positioned behind lens 68 to attenuate the total amount of light that impinges the light intensifier 30. As shown in FIG. 7, iris 50 is adjustable between a full aperture opening designated 52 and its smallest aperture opening designated 54. In FIG. 7, the iris is shown in intermediate position to form pupil 55.

The relative intensity of the near and distant image focused on light intensifier 30 can be varied using a polarizing filter 70 which can be mounted at the end of housing 26. Alternatively, polarizing filter 70 can be mounted between the lens 68 and iris 50 or between iris 50 and light intensifier 30. The polarizing filter 70 is rotatably mounted with respect to the birefringent lens 68. As shown in FIG. 7, the filter 70 can be rotated 90 to be aligned either with the slow axis or the fast axis of birefringent lens 68. Between the two extreme positions 71 and 72 which provides for focus of the near or far scene respectively, the intermediate position 73 allows for equal ratios of light from both the near scene and distant scene to impinge light intensifier. The embodiment illustrated in FIGS. 6 and 7 provides total control in both the proportional intensity of the near and distant scene and the attenuation of the total amount of light impinging upon light intensifier 30.

Figure 8:
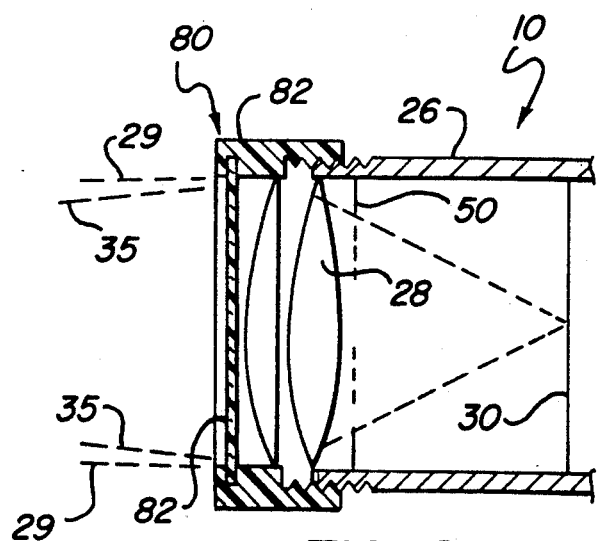
FIG. 8 is a fragmentary schematic view of a fourth embodiment of the invention.

The principles used in FIG. 6 and 7 can also be used in a retrofittable design for present-day monofocus systems as illustrated in FIG. 8. The monofocus system 10 in FIG. 8 is identical to the monofocus system shown in FIG. 2 with refracting lens 28, iris 50 and tubular housing 26. The kinoform lens 40 in FIG. 2 is replaced with an end cap assembly 80. The assembly 80 includes a frame 82 fitted onto the end of housing 26. The frame 82 mounts a birefringent lens 78 and a polarizing filter 82. Birefringent lens 78 has zero power along its fast axis but has a focal length of a few feet along its slow axis to be used in conjunction with the refracting power of lens 28 to focus light rays 35 polarized along the slow axis emanating from near objects to be focused onto light intensifier 30. The polarizing filter 82 is rotatably mounted in frame 82 such that it can have its polarizing axis be adjustably aligned with the fast or slow axis of lens 78 or at an intermediate position therebetween in the same fashion as polarizing filter 70. The rotatability of filter 82 with respect to lens 78 adjustably proportions the amount of light focused along the slow axis versus the amount of light focused along the fast axis to provide for adjustment of the relative intensities of the far scene and the near scene.

While the above embodiments have been described with the standard monofocus night vision system focused to the distant scene and the retrofit diffracting kinoform 40 or retrofit bifringent lens assembly 80 constructed to add a focused near scene; it is also foreseen that night vision systems can be constructed with the refracting lens set to focus the near scene and the kinoforms or bifringent lenses add a focused distant scene.

The invention has several distinct advantages. Firstly, either a new night vision system can be made in accordance with the concepts of the invention as shown in FIGS. 5 and 6 or a standard night vision system can be retrofitted as shown in FIGS. 2 and 8. The new night vision systems and retrofitted night vision systems are used in exactly the same way so that a user can be immediately comfortable with the specific system that is being used.

This invention is compatible with adjustable night vision systems that adjustably attenuate the total amount of light entering the light intensifier. The invention eliminates the diffractive problems associated with bi-focal and other split lens systems when the iris defines a sufficiently small pupil.

Furthermore, for the embodiments shown in FIGS. 2 and 6 using kinoforms 40 and 60, chromatic aberration is reduced because light of longer wavelength undergoes more diffraction through a kinoform and its focus is thereby closer. On the other hand, light of longer wavelengths refract less through a refracting lens and therefore have a longer focus. The combination of the kinoform with a refracting lens therefore provides for chromatic correction. The chromatic correction can be provided by the single combined diffraction and refracting lens 58. The chromatic correction allows for a night system that can use a wide optical bandwidth.

Furthermore, the night vision system 10 provides proportionally adjusted image intensities between the near and distant scenes by either replacement of a kinoform lens or by rotation of a polarizing filter for the bifringent lens models.

Other variations and modifications are possible within the scope of the foregoing disclosure, drawings and the appended claims without departing from the spirit of the invention.

The embodiments of the invention in which an exclusive property or privilege is claimed are defined as follows:

1. An apparatus for low light optical use including a light intensifier of forming an intensified image of a light image received thereon, the improvement characterized by:
   first and second focusing means disposed in tandem in a light path from respective first and second distance for focusing light from the respective first and second distances onto the light intensifier;
   said second focusing means being coextensive with an objective aperture defined by said first focusing means and having essentially the same wavelength band pass characteristic as said first focusing means.

2. An apparatus as defined in claim 1 further characterized by:
   said first focusing means includes a diffraction lens positioned in and substantially filling said objective aperture, said second focusing means transmitting throughout said objective aperture a first portion of light diffracted thereby and a second portion of light undiffracted thereby, whereby
   said first portion of light from said second distance diffracted by said diffraction lens is focused in conjunction with said refracting lens onto the light intensifier, and
   said second portion of light from said first distance undiffracted by said diffraction lens is focused solely by said refracting lens onto the light intensifier.

3. An apparatus as defined in claim 2 further characterized by:
   said diffraction lens being a separate member and mountable adjacent said refracting lens.

4. An apparatus as defined in claim 3 further characterized by:
   said refracting lens being interposed between said diffraction lens and the light intensifier such that said diffracted light is diffracted first before being refracted by said refracting lens onto the light intensifier.

5. An apparatus as defined in claim 2 further characterized by:
   said diffraction lens and said refracting lens being integrally formed.

6. An apparatus as defined in claim 2 further characterized by:
   a single adjustable iris disposed in the light path from said respective first and second distances and in proximity to said objective aperture for adjusting the amount of light impinging on the light intensifier from said first and second distances.

7. An apparatus as defined in claim 1 further characterized by:

said first focusing means includes a refracting birefringent lens wherein light of a first polarity from the first distance is focused onto said light intensifier; and said second focusing means includes said refracting birefringent lens wherein light from said second distance having a second polarity substantially orthogonal to the first polarity is focused onto said light intensifier.

8. An apparatus as defined in claim 7 further characterized by:

a polarizing filter being disposed in the light path to the light intensifier and being adjustable with respect to said birefringent lens to vary the ratio of light of said first polarity and said second polarity being transmitted therethrough.

9. An apparatus as defined in claim 1 further characterized by:

said first focusing means includes a refracting lens constructed with a focal length such that light from the first distance is focused onto said light intensifier;

said second focusing means includes a birefringent lens constructed such that light of a first polarity passes through said birefringent lens with no focusing effect such that said light of said first polarity from said first distance is focused onto the light intensifier solely by said refracting lens and light from said second distance having a second polarity substantially orthogonal to said first polarity is focused by said birefringent lens in conjunction with the refracting lens onto said light intensifier.

10. An apparatus as defined in claim 9 further characterized by:

a polarizing filter in the light path to the light intensifier and adjustable with respect to said birefringent lens to vary the ratio of light of said first polarity and light of said second polarity being transmitted therethrough.

11. A multi-focus low light vision apparatus comprising:

a light intensifier having an input screen and an output screen for producing at said output screen a light intensified image of a light image impinging on said input screen;

a first focusing means having an objective aperture and essentially no spectral filtering; and a second focusing means having said objective aperture and essentially no spectral filtering, said first and second focusing means disposed in tandem whereby a portion of light from a first distance passes through both said first and second focusing means and is focused thereby onto said input screen of said light intensifier and a portion of light from a second distance passes through both said first and second focusing means and is focused thereby onto said input screen of said light intensifier.

12. The multi-focus low light vision apparatus as claimed in claim 11, whereby:

said first focusing means includes a refracting lens having a focal length for focusing light from the first distance onto said input screen of said light intensifier; and said second focusing means includes a diffraction lens transmitting throughout said objective aperture a first diffracted portion of light and a second undiffracted portion of light, said first diffracted portion of light from said second distance diffracted by said diffraction lens in an amount for said refracting lens to focus said first diffracted portion of light from said second distance onto said input screen of said light intensifier, and said second undiffracted portion of light from said first distance being focused solely by said refracting lens onto said input screen of said light intensifier.

13. The multi-focus low light vision apparatus as claimed in claim 12, whereby:

said diffraction lens of said second focusing means consists of a kinoform lens having a depth selected with regard to a predetermined wavelength for providing a predetermined proportion of said first diffracted portion of light and said second undiffracted portion of light.

14. The multi-focus low light vision apparatus as claimed in claim 13, whereby:

said diffraction lens of said second focusing means consists of a kinoform lens having a depth of one half said predetermined wavelength for providing approximately equal proportions of received light in said first diffracted portion of light and said second undiffracted portion of light.

15. The multi-focus low light vision apparatus as claimed in claim 13, whereby:

said diffraction lens of said second focusing means consists of a kinoform lens having a depth of one fifth said predetermined wavelength for providing approximately 20% of received light in said second undiffracted portion of light.

16. The multi-focus low light vision apparatus as claimed in claim 11, whereby:

said first focusing means includes a refracting lens having a focal length for focusing light from the first distance onto said input screen of said light intensifier; and said second focusing means includes a kinoform lens formed on a surface of said refracting lens, said kinoform lens transmitting throughout said objective aperture a first diffracted portion of light and a second undiffracted portion of light, said first diffracted portion of light from said second distance diffracted by said diffraction lens in an amount for said refracting lens to focus said first diffracted portion of light from said second distance onto said input screen of said light intensifier, and said second undiffracted portion of light from said first distance being focused solely by said refracting lens onto said input screen of said light intensifier.

17. The multi-focus low light vision apparatus as claimed in claim 16, whereby:

said first focusing means consists of a double convex refracting lens; and said second focusing means includes a kinoform lens formed on a convex surface of said double convex refracting lens.

18. The multi-focus low light vision apparatus as claimed in claim 16, whereby:

said first focusing means consists of a plano-convex refracting lens; and said second focusing means includes a kinoform lens formed on a planar surface of said plano-convex refracting lens.

19. The multi-focus low light vision apparatus as claimed in claim 11, whereby:

said first focusing means includes a refracting lens having a focal length for focusing light from the first distance onto said input screen of said light intensifier; and said second focusing means includes a refracting birefringent lens having a predetermined focusing effect for light of a first polarity and essentially no focusing effect for light of a second polarity orthogonal to said first polarity, light of said first polarity from said second distance refracted by said predetermined focusing effect of said refracting birefringent lens in an amount for said refracting lens to focus light of said first polarity from said second distance onto said input screen of said light intensifier, and light of said second polarity being focused solely by said refracting lens onto said input screen of said light intensifier.

20. The multi-focus low light vision apparatus as claimed in claim 19, further comprising:

a polarizing filter disposed in tandem with said first and second focusing means having a polarizing filter axis rotatable between a position essentially aligned with said first polarity and a position essentially aligned with said second polarity for varying the proportion of light of said first and second polarities reaching said input screen of said light intensifier.

21. The multi-focus low light vision apparatus as claimed in claim 11, whereby:

said first focusing means includes a refracting birefringent lens having a first focal length for focusing light a first polarity from the first distance onto said input screen of said light intensifier and essentially no focusing effect for light of a second polarity orthogonal to said first polarity; and said second focusing means includes a refracting birefringent lens having a second focal length for focusing light of said second polarity from the second distance onto said input screen of said light intensifier and essentially no focusing effect for light of said first polarity.

22. The multi-focus low light vision apparatus as claimed in claim 21, further comprising:

a polarizing filter disposed in tandem with said first and second focusing means having a polarizing filter axis rotatable between a position essentially aligned with said first polarity and a position essentially aligned with said second polarity for varying the proportion of light of said first and second polarities reaching said input screen of said light intensifier.

23. A retrofit apparatus for use with a low light vision apparatus having a first focusing system disposed in a first objective aperture for focusing light from a first distance onto the input screen of a light intensifier, the light intensifier for producing at an output screen a light intensified image of a light image impinging on the input screen, said retrofit apparatus comprising:

a second focusing means having a second objective aperture essentially the same as the first objective aperture and having essentially no spectral filtering, said second focusing means constructed whereby when disposed in tandem with the first focusing means a portion of light from a first distance passes through both said first and second focusing means and is focused thereby onto said input screen of said light intensifier and a portion of light from a second distance passes through both said first and second focusing means and is focused thereby onto said input screen of said light intensifier; and a mounting means having said second focusing means disposed thereon, said mounting means mountable on the low light vision apparatus for disposing said second focusing means in the first objective aperture in tandem with the first focusing means.

24. The retrofit apparatus as claimed in claim 23, whereby:

said second focusing means includes a diffraction lens transmitting throughout said second objective aperture a first diffracted portion of light and a second undiffracted portion of light, said first diffracted portion of light from said second distance diffracted by said diffraction lens in an amount for the first focusing means to focus said first diffracted portion of light from said second distance onto said input screen of said light intensifier, and said second undiffracted portion of light from said first distance being focused solely by the first focusing means onto said input screen of said light intensifier.

25. The retrofit apparatus as claimed in claim 24, whereby:

said diffraction lens of said second focusing means consists of a kinoform lens having a depth selected with regard to a predetermined wavelength for providing a predetermined proportion of said first diffracted portion of light and said second undiffracted portion of light.

26. The retrofit apparatus as claimed in claim 25, whereby:

said diffraction lens of said second focusing means consists of a kinoform lens having a depth of one half said predetermined wavelength for providing approximately equal proportions of received light in said first diffracted portion of light and said second undiffracted portion of 27. The retrofit apparatus as claimed in claim 25, whereby:

said diffraction lens of said second focusing means consists of a kinoform lens having a depth of one fifth said predetermined wavelength for providing approximately 20% of received light in said second undiffracted portion of light.

28. The multi-focus low light vision apparatus as claimed in claim 23, whereby:

said second focusing means includes a refracting birefringent lens having a predetermined focusing effect for light of a first polarity and essentially no focusing effect for light of a second polarity orthogonal to said first polarity, light of said first polarity from said second distance refracted by said predetermined focusing effect of said refracting birefringent lens in an amount for the first focusing means to focus light of said first polarity from said second distance onto said input screen of said light intensifier, and light of said second polarity being focused solely by the first focusing means onto said input screen of said light intensifier.

29. The retrofit apparatus as claimed in claim 28, further comprising:

a polarizing filter disposed on said mounting means in tandem with said second focusing means having a polarizing filter axis rotatable between a position essentially aligned with said first polarity and a position essentially aligned with said second polarity for varying the proportion of light of said first and second polarities reaching said input screen of said light intensifier.

* * * * *